(12) United States Patent
Hayashi (10) Patent No.: US 8,844,901 B2
(45) Date of Patent: Sep. 30, 2014

(54) FLOW CONTROL VALVE (75) Inventor: Shigeyuki Hayashi, Kyoto (JP)

(73) Assignee: Horiba STEC, Co., Ltd., Kyoto-shi (JP)

( * ) Notice: Subject to any disclaimer, the term of this patent is extended or adjusted under 35 U.S.C. 154(b) by 696 days.

(21) Appl. No.: 12/413,328

(22) Filed: Mar. 27, 2009

(65) Prior Publication Data
US 2010/0243076 A1 Sep. 30, 2010

(51) Int. Cl.
*F16K 47/04* (2006.01)
(52) U.S. Cl.
USPC ....... 251/123; 251/333; 251/360; 137/601.14
(58) Field of Classification Search
CPC ........... F16K 1/42; F16K 25/00; F16K 47/04; G05D 47/04
USPC .......... 251/259, 360, 359, 123, 333; 137/512.1, 599.01, 487.5, 625.33, 137/625.37, 601.14
See application file for complete search history.

(56) References Cited

U.S. PATENT DOCUMENTS

| | | | | | |
|---|---|---|---|---|---|
| 2,838,068 | A | * | 6/1958 | Alton | 137/625.33 |
| 4,515,129 | A | * | 5/1985 | Stettner | 123/472 |
| 4,570,598 | A | * | 2/1986 | Samson et al. | 123/445 |
| 4,572,436 | A | * | 2/1986 | Stettner et al. | 239/124 |
| 4,638,974 | A | * | 1/1987 | Zeuner et al. | 251/129.15 |
| 4,666,126 | A | * | 5/1987 | Tujimura et al. | 251/282 |
| 4,756,331 | A | * | 7/1988 | Stegmaier | 137/271 |
| 4,872,481 | A | * | 10/1989 | Shaw et al. | 137/543.17 |
| 4,917,307 | A | * | 4/1990 | Baxter et al. | 239/585.3 |
| 4,932,632 | A | * | 6/1990 | Nicol | 251/129.02 |
| 4,941,447 | A | * | 7/1990 | Mannhardt | 123/455 |
| 4,958,773 | A | * | 9/1990 | Stettner et al. | 239/585.3 |
| 4,958,774 | A | * | 9/1990 | Taylor | 239/585.3 |
| 4,987,923 | A | * | 1/1991 | Tackett | 137/596.17 |
| 5,054,691 | A | * | 10/1991 | Huang et al. | 239/585.3 |
| 5,154,350 | A | * | 10/1992 | Ausiello et al. | 239/96 |
| 5,251,871 | A | * | 10/1993 | Suzuki | 251/127 |
| 5,348,232 | A | * | 9/1994 | Babitzka et al. | 239/585.4 |
| 5,372,313 | A | * | 12/1994 | Chabon et al. | 239/585.3 |

(Continued)

FOREIGN PATENT DOCUMENTS

| | | |
|---|---|---|
| JP | 6116460 U | 1/1986 |
| JP | 0233978 U | 3/1990 |

(Continued)

OTHER PUBLICATIONS

Japanese Patent Office, Summary of the Decision to Grant a Patent of Japanese Patent Application No. 2010-022186, Aug. 5, 2014, 4 pages.

*Primary Examiner* — William McCalister
(74) *Attorney, Agent, or Firm* — Alleman Hall McCoy Russell & Tuttle LLP (57) ABSTRACT

A flow control valve is disclosed that includes a valve body member having a seating surface that is seated on a valve seated surface. Multiple inflow orifices and multiple outflow orifices may be formed on the valve seated surface or the seating surface, and may be formed so as not to overlap each other in a state in which the seating surface is seated on the valve seated surface. An inside inflow channel that is in communication with the inflow channel and the inflow orifice may be formed inside a member where the inflow orifices are formed and an inside outflow channel that is in communication with the outflow channel and the outflow orifice is formed inside a member where the outflow orifices are formed.

13 Claims, 8 Drawing Sheets

(56) References Cited

U.S. PATENT DOCUMENTS

| | | | |
|---|---|---|---|
| 5,381,966 A * | 1/1995 | Gernert, II | 239/585.3 |
| 5,485,984 A * | 1/1996 | Itoi et al. | 251/331 |
| 5,582,208 A * | 12/1996 | Suzuki | 137/625.33 |
| 5,909,747 A * | 6/1999 | Schieber | 137/492 |
| 5,927,331 A * | 7/1999 | Suzuki | 137/625.33 |
| 5,975,126 A * | 11/1999 | Bump et al. | 137/487.5 |
| 5,979,866 A * | 11/1999 | Baxter et al. | 251/129.21 |
| 6,405,427 B2 * | 6/2002 | Kummer | 29/606 |
| 6,766,969 B2 * | 7/2004 | Haltiner et al. | 239/596 |
| 6,926,032 B2 * | 8/2005 | Nawaz | 137/625.33 |

FOREIGN PATENT DOCUMENTS

| | | |
|---|---|---|
| JP | 2116071 U | 9/1990 |
| JP | 09072435 A | 3/1997 |
| JP | 10318401 A | 12/1998 |
| JP | 2000/197374 | 7/2000 |

* cited by examiner

FLOW CONTROL VALVE

FIELD OF THE ART

This invention relates to a flow control valve used for a mass flow controller that controls a flow of, for example, gas.

BACKGROUND ART

Conventionally, as described in Japan Patent Laid-open number 2000-197374, a flow control valve used for a mass flow controller has the following arrangement: two inside flow channels are formed on a valve seat member wherein one end of one of the inside flow channels is in communication with an inflow channel and the other end thereof is in communication with an opening formed on a valve seated surface, and one end of the other inside flow channel is in communication with an outflow channel and the other end thereof is in communication with an opening formed on the valve seated surface. In other words, the conventional flow control valve has one opening for the fluid flowing in from an inflow channel and one opening for the fluid flowing out into an outflow channel. Then a diaphragm driven by an actuator such as a piezoelectric element is made to be seated on the valve seated surface or to be separated from the valve seated surface so that a flow is controlled.

It is necessary for the flow control valve having the above arrangement to lengthen a distance (hereinafter referred to as an "aperture") between the valve seated surface and the seating surface in order to increase a flow of the fluid.

However, concerning a means to enlarge the aperture, there is a limit for a stroke width of the actuator such as the piezoelectric element as being a driving means of the diaphragm, and it is necessary to enlarge the actuator in order to increase the stroke width. Then there is a problem that the size and shape of the flow control valve becomes bulky.

In addition, concerning a means to enlarge a diameter of an inflow orifice and an outflow orifice of the flow control valve, the bigger the diameter is made, the bigger the area of the valve seated surface becomes. As a result there is a problem that the size and shape of the flow control valve becomes bulky.

DISCLOSURE OF THE INVENTION

The present claimed invention addresses the above discussed issues, and has an object to provide a compact flow control valve that can flow fluid of a high flow rate.

More specifically, the flow control valve in accordance with this invention is a flow control valve that is arranged in a flow channel where fluid flows and that expels the fluid into an outflow channel as being a downstream flow channel by controlling a flow of the fluid from an inflow channel as being an upstream flow channel, and comprises a valve seat member having a valve seated surface and a valve body member having a seating surface that is seated on the valve seated surface, wherein multiple inflow orifices and multiple outflow orifices are formed on the valve seated surface or the seating surface, and the inflow orifices and the outflow orifices are formed so as not to overlap each other in a state in which the seating surface is seated on the valve seated surface, and an inside inflow channel that is in communication with the inflow channel and the inflow orifice is formed inside a first or second member where the inflow orifices are formed and an inside outflow channel that is in communication with the outflow channel and the outflow orifice is formed inside a first or second member where the outflow orifices are formed. In one embodiment, the first member where the inside inflow channel is formed is the valve seat member and the second member where the inside outflow channel is formed is also the valve seat member, and in a modified embodiment, the first member where the inside inflow channel is formed is the valve body member and the second member where the inside outflow channel is formed is the valve seat member.

In accordance with this arrangement, since the inflow orifices and the outflow orifices are formed plurally on the valve seated surface or the seating surface, it is possible to flow the fluid at a high flow rate with a compact arrangement.

In order to make it possible to flow the fluid at high flow under a low differential pressure by reducing the pressure loss between the inflow orifice and the outflow orifice, it is preferable that the inflow orifice and the outflow orifice are formed on the valve seated surface and the inside inflow channel and the inside outflow channel are formed in the valve seat member, and the inflow orifice and the outflow orifice are formed on a bottom surface of a concave part formed on the valve seated surface, and the inflow orifice is formed on a bottom surface of the concave part that is different from the concave part where the outflow orifice is formed.

In order to further reducing the pressure loss by shortening the distance between the inflow orifice and the outflow orifice as much as possible and by elongating a boundary length of the inflow orifice and a boundary length of the outflow orifice as much as possible, it is preferable that the concave part includes multiple generally concentrically formed concave grooves, and the inflow orifice and the outflow orifice are alternately formed on the multiple concave grooves.

In order to facilitate manufacturing a flow control valve and to make it possible to effectively utilize an area of the valve seated surface and an area of the seating surface, it is preferable that the inflow orifice and the outflow orifice are arranged radially.

In addition, the flow control valve in accordance with this invention is a flow control valve that is arranged in a flow channel where fluid flows and that expels the fluid into an outflow channel as being a downstream flow channel by controlling a flow of the fluid from an inflow channel as being an upstream flow channel, and comprises a valve seat member having a valve seated surface and a valve body member having a seating surface that is seated on the valve seated surface, wherein an inflow orifice and an outflow orifice are formed on the valve seated surface or the seating surface, and the inflow orifice and the outflow orifice are formed so as not to overlap each other in a state in which the seating surface is seated on the valve seated surface, an inside inflow channel that is in communication with the inflow channel and the inflow orifice is formed inside a first or second member where the inflow orifice is formed and an inside outflow channel that is in communication with the outflow channel and the outflow orifice is formed inside a first or second member where the outflow orifice is formed, and the inflow orifice and the outflow orifice are arranged on a bottom surface of a concave part formed on the valve seated surface or the seating surface. In one embodiment, the first member where the inside inflow channel is formed is the valve seat member and the second member where the inside outflow channel is formed is also the valve seat member, and in a modified embodiment, the first member where the inside inflow channel is formed is the valve body member and the second member where the inside outflow channel is formed is the valve seat member.

In accordance with this arrangement, it is possible to reduce the pressure loss between the inflow orifice and the outflow orifice and to flow the fluid at a high flow rate under a low differential pressure.

In order to further reduce the pressure loss by shortening the distance between the inflow orifice and the outflow orifice as much as possible and by elongating a boundary length of the inflow orifice and a boundary length of the outflow orifice as much as possible, it is preferable that the concave part on which the inflow orifice is formed and the concave part on which the outflow orifice is formed are concave grooves, and the concave grooves are formed generally concentrically.

Furthermore, a mass flow controller in accordance with this invention is characterized by comprising a flow sensor, the above-mentioned flow control valve and a control part that controls a valve open degree of the flow control valve based on a measured flow value output by the flow sensor and a set flow value as being a target flow.

In accordance with this invention having the above-mentioned arrangement, it is possible to provide a compact flow control valve that can flow fluid at a high flow rate.

BEST MODES OF EMBODYING THE INVENTION

One embodiment of a mass flow controller 100 into which a flow control valve in accordance with the present claimed invention is incorporated will be explained with reference to drawings.

<Configuration>

Figure 1:
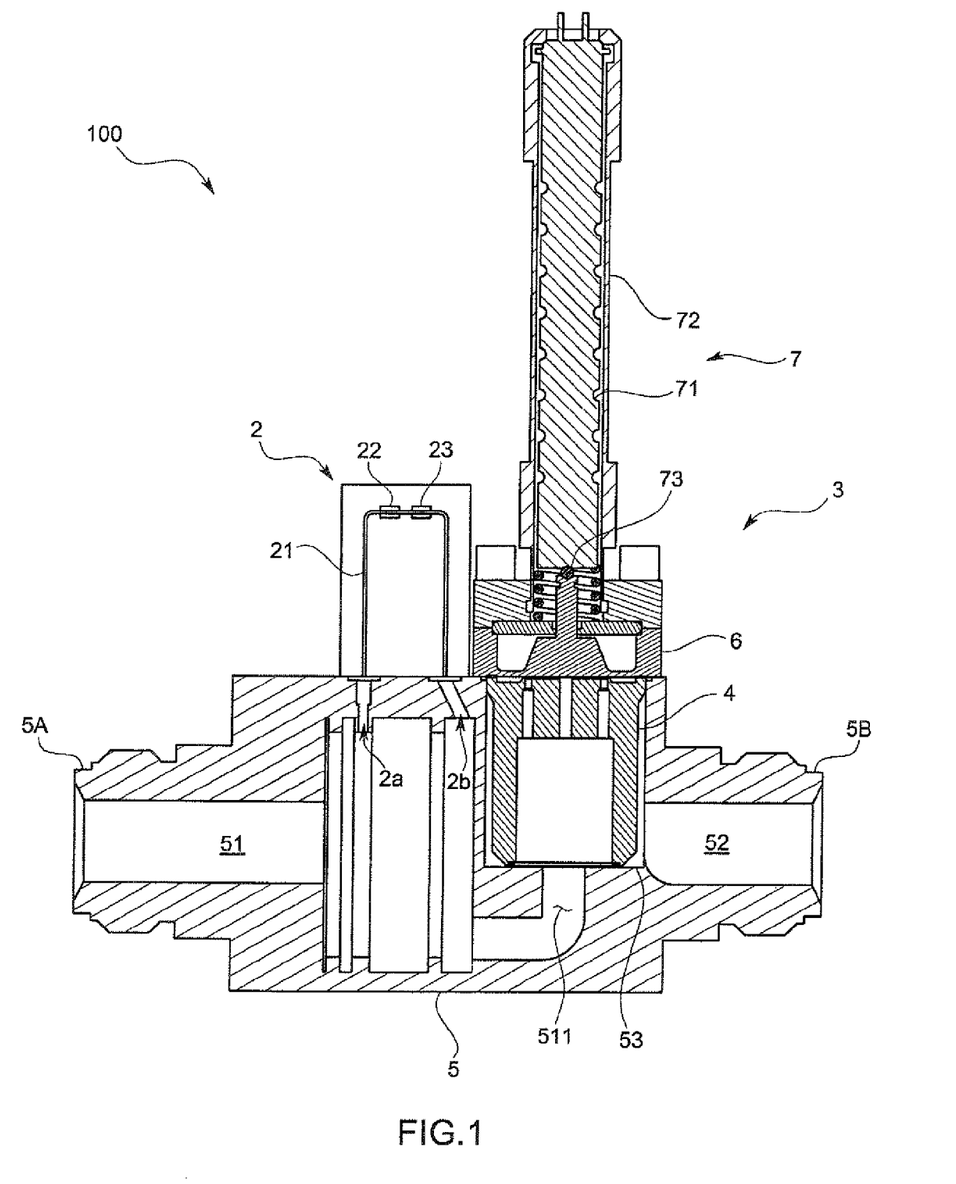
FIG. 1 is an overall pattern diagram of a mass flow controller in accordance with one embodiment of this invention.

The mass flow controller 100 of this embodiment comprises, as shown in FIG. 1, a flow sensor 2 and a flow control valve 3 both of which are integrally formed, and a control part (not shown in drawings) that controls a valve open degree of the flow control valve 3 based on a measured flow value output by the flow sensor 2 and a set flow value as being a target flow.

The flow sensor 2 is formed by winding multiple resistive elements 22, 23 around a duct 21 comprising, for example, a thin-walled capillary that connects a measurement flow channel inlet 2a that opens to face a fluid flow channel 51 with a measurement flow channel outlet 2b, and the resistive elements 22, 23 are connected to a bridge circuit, not shown in drawings.

The flow control valve 3 is to change its valve opening degree by means of an actuator. The flow control valve 3 drives the actuator at a time when an opening degree control signal as being an electric signal is given by a control part and controls a flow of the fluid by adjusting the valve opening degree in accordance with a value of the opening degree control signal.

Concretely, the flow control valve 3 is, as its pattern diagram is shown in FIG. 1, a normal open type flow control valve using a valve seat member 4 wherein a valve orifice and a valve seat are integrally formed, arranging a seal member on a diaphragm placing surface of a body block 5 that accommodates the valve seat member 4, and arranging a diaphragm 6 as being a valve body member on the body block 5 through the seal member.

The body block 5 has an upstream side connecting port 5A, a downstream side connecting port 5B, a fluid flow channel (inflow channel) 51 connected to the upstream side connecting port 5A, a fluid flow channel (outflow channel) 52 connected to the downstream side connecting port 5B, and a concave part for housing 53 arranged between the inflow channel 51 and the outflow channel 52.

The inflow channel 51 and the outflow channel 52 open to face an inner surface of the concave part for housing 53, and in this embodiment the inflow channel 51 has a perpendicular flow channel 511 that opens on a bottom surface of the concave part for housing 53. In addition, the outflow channel 52 opens at a bottom side of a side surface of the concave part for housing 53.

The concave part for housing 53 opens on a surface (an upper surface, in this embodiment) of the body block 5, and houses the valve seat member 4, to be described later. Then a flow channel that connects the outflow channel 52 with an inside outflow channel 42, to be described later, formed in the valve seat member 4 is formed by a side peripheral surface of the valve seat member 4 and a side wall forming the concave part for housing 53 in a state of housing the valve seat member 4.

The valve seat member 4 is, as shown in FIG. 3 through FIG. 6, generally in a shape of a body of revolution, wherein a valve seated surface 401 is formed on one end surface (an upper surface) of the valve seat member 4, and an inside flow channel that opens as a valve orifice is formed on the valve seated surface 401. In addition, in a state that the valve seat member 4 is housed in the concave part for housing 53, the valve seat member 4 is arranged to surround an opening on a bottom surface of the concave part for housing 53 of the inflow channel 51, and a bottom surface of the valve seat member 4 is liquid-tightly arranged (refer to FIG. 1) on the bottom surface of the concave part for housing 53 through a seal member such as an O-ring or the like.

More concretely, the valve seat member 4 is fixed to the bottom surface of the concave part for housing 53 through a spacer member by being pushed by a side peripheral part of the diaphragm 6 in a state that the diaphragm as being the valve body member 6 is fixed to the diaphragm placing surface of the body block 5.

The valve body member 6 is the diaphragm arranged to block the opening of the concave part for housing 53 of the body block 5, and a side peripheral edge of the valve body member 6 is liquid-tightly fixed to a peripheral part of an upper opening of the concave part for housing 53 through a seal member such as a metal O-ring or the like. In addition, as shown in FIG. 1, a center part of the diaphragm 6 makes a back and forth movement relative to the valve seat member 4 by means of the actuator 7 and the diaphragm 6 has a seating surface 601 that is seated on or detaches from the valve seated surface 401 of the valve seat member 4.

The actuator 7 comprises piezoelectric stacks 71 that are formed with multiple laminated piezoelectric elements that transform to be bulgy in a state in which the electric voltage is applied, the piezoelectric stacks 71 are accommodated in a housing body 72, and pushing force is applied to the valve body member 6 through a perfect sphere 73.

Figure 3:
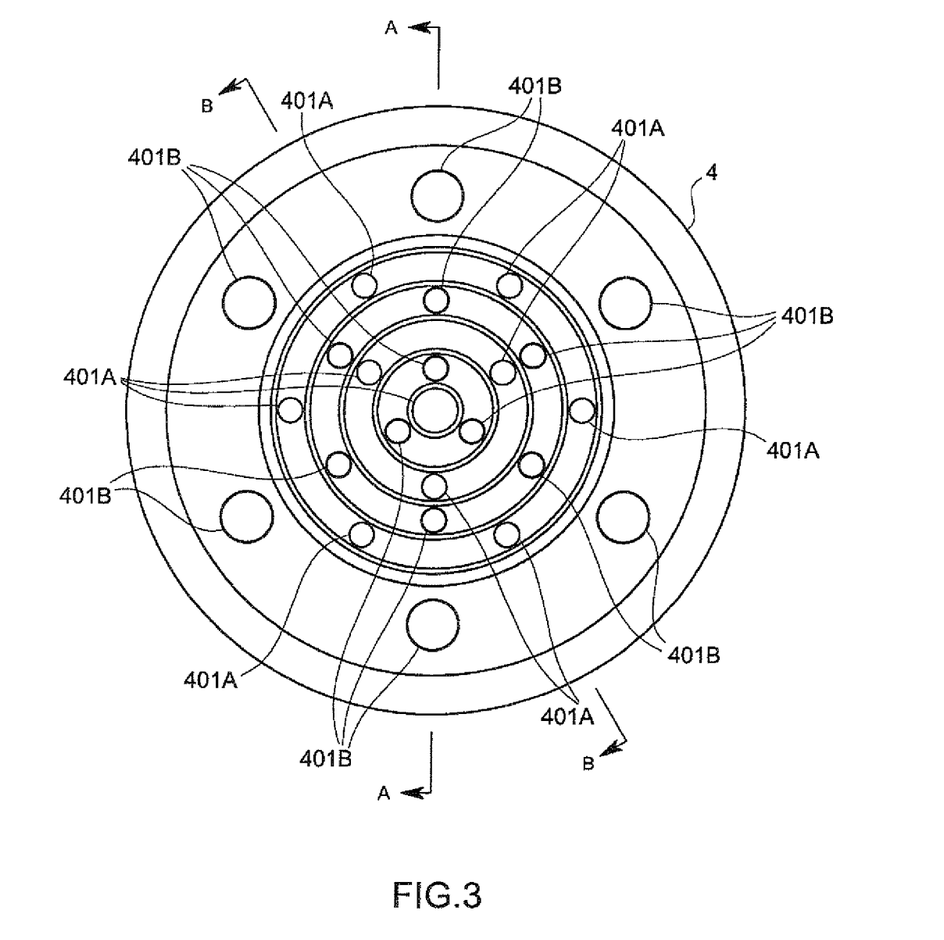
FIG. 3 is a plane view of a valve seat member in accordance with this embodiment.
Figure 4:
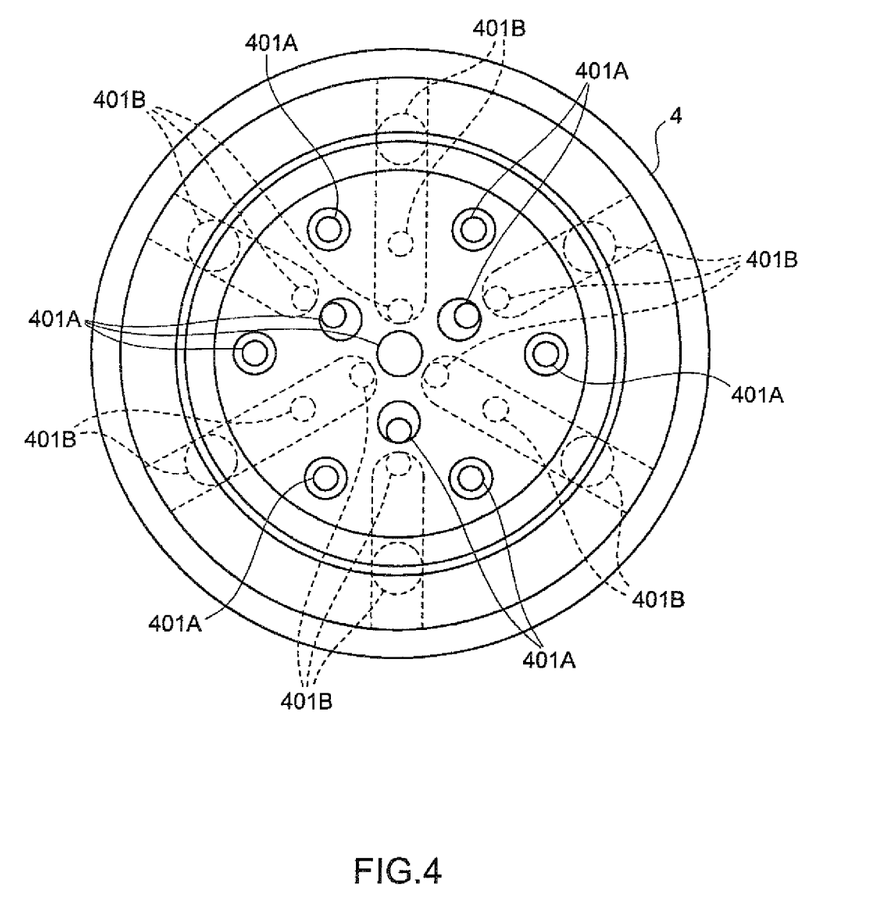
FIG. 4 is a bottom view of the valve seat member in accordance with this embodiment.

Then, as shown in FIG. 3, the valve seated surface 401 of the valve seat member 4 in this embodiment is provided with multiple inflow orifices 401A as being a valve orifice and multiple outflow orifices 401B as being a valve orifice respectively. In other words, the flow control valve 3 in this embodiment divaricates the fluid from the inflow channel 51 and supplies the fluid to the multiple inflow orifices 401A formed on the valve seated surface 401, and expels the fluid from the multiple outflow orifices 401B formed on the valve seated surface 401 so as to flow into each other again and then introduces the confluent fluid to the outflow channel 52.

Figure 5:
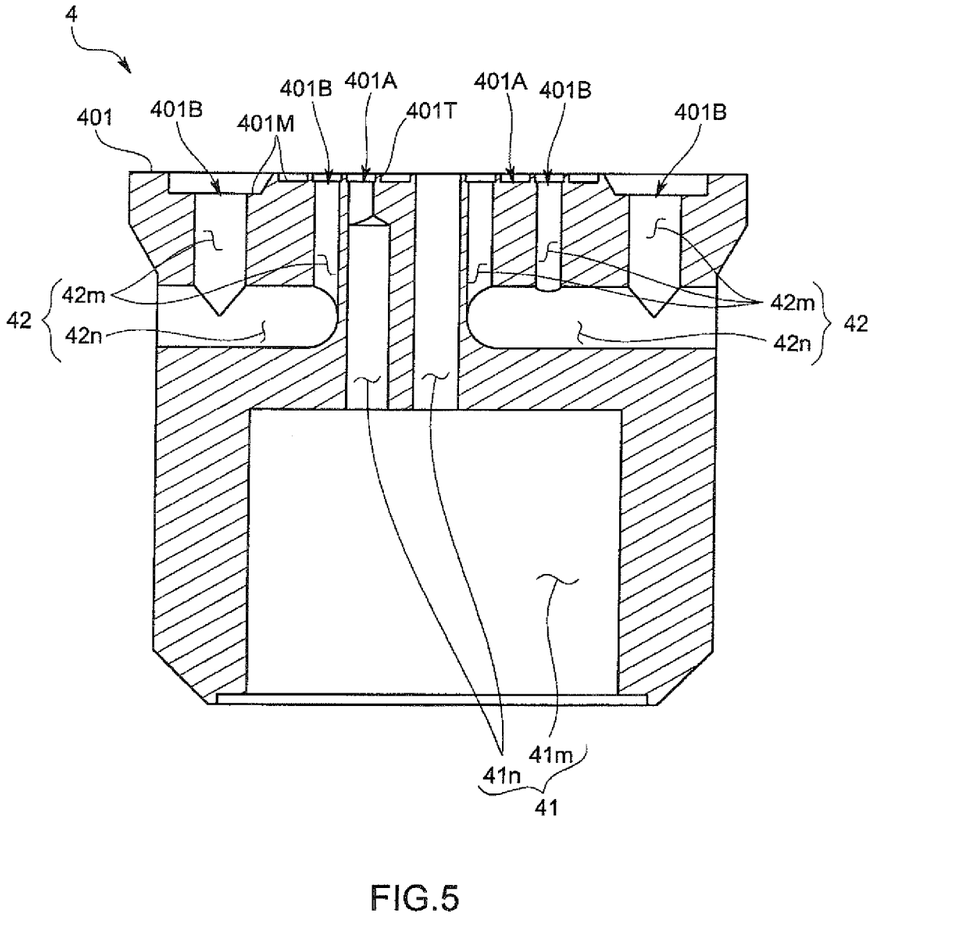
FIG. 5 is a cross-sectional view of the valve seat member in accordance with this embodiment taken along a line A-A.
Figure 6:
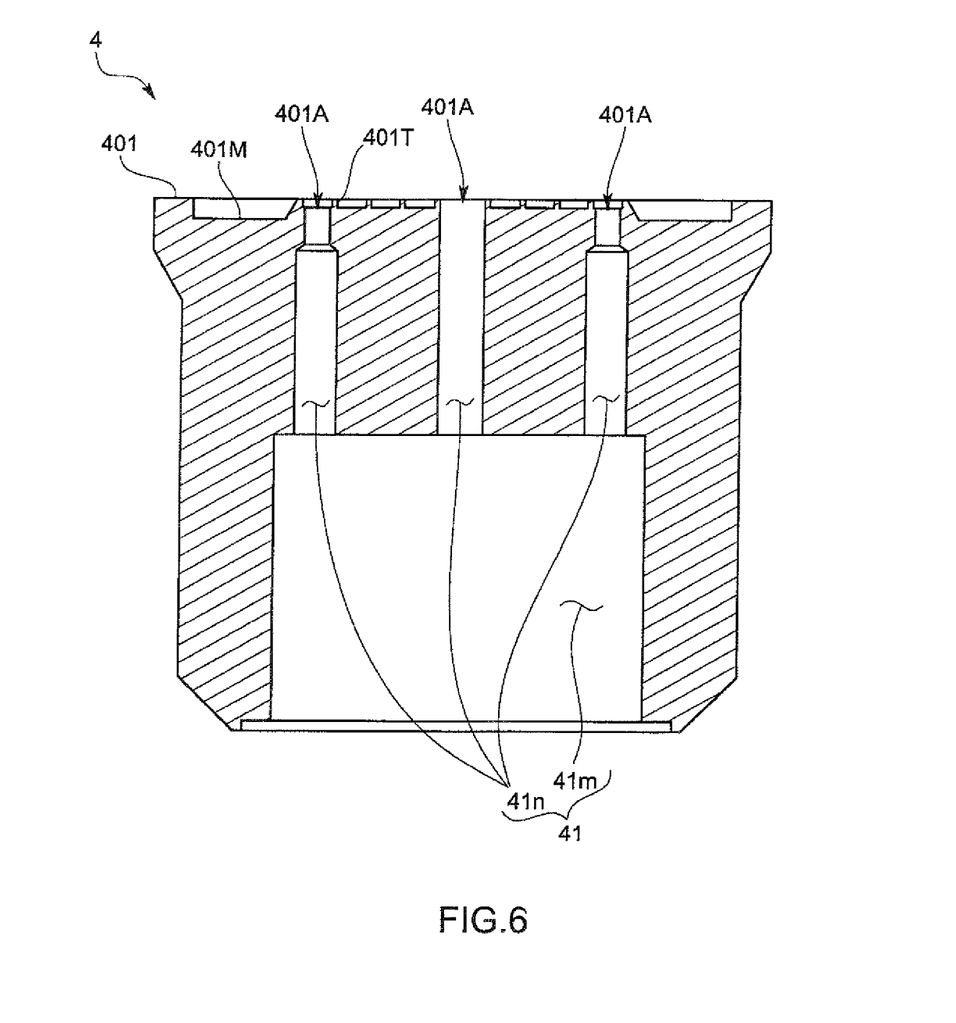
FIG. 6 is a cross-sectional view of the valve seat member in accordance with this embodiment taken along a line B-B.

In addition, multiple circular concave grooves 401M are formed concentrically on the valve seated surface 401 of the valve seat member 4, as shown in FIG. 5 and FIG. 6, and an upper surface of convexity 401T that divides off the concave grooves 401M makes contact with the valve body member 6. In this embodiment, an inside inflow channel 41 is formed at a center of the valve seat member 4, the five concave grooves 401M and the five convexities 401T are concentrically formed with a center on the inside of inflow channel 41. Thus, in this embodiment, the inflow orifices and the outflow orifices are formed on the valve seated surface, and the first member where the inside inflow channel is formed is the valve seat member, and the second member where the inside outflow channel is formed is also the valve seat member.

The inflow orifice 401A as being one end of the inside inflow channel 41 is formed to open on the bottom surface of the concave groove 401M, and the outflow orifice 401B as being one end of the inside outflow channel 42 is formed to open on the bottom surface of the concave groove 401M that is different from the concave groove 401M where the inflow orifice 401A is formed.

Figure 2:
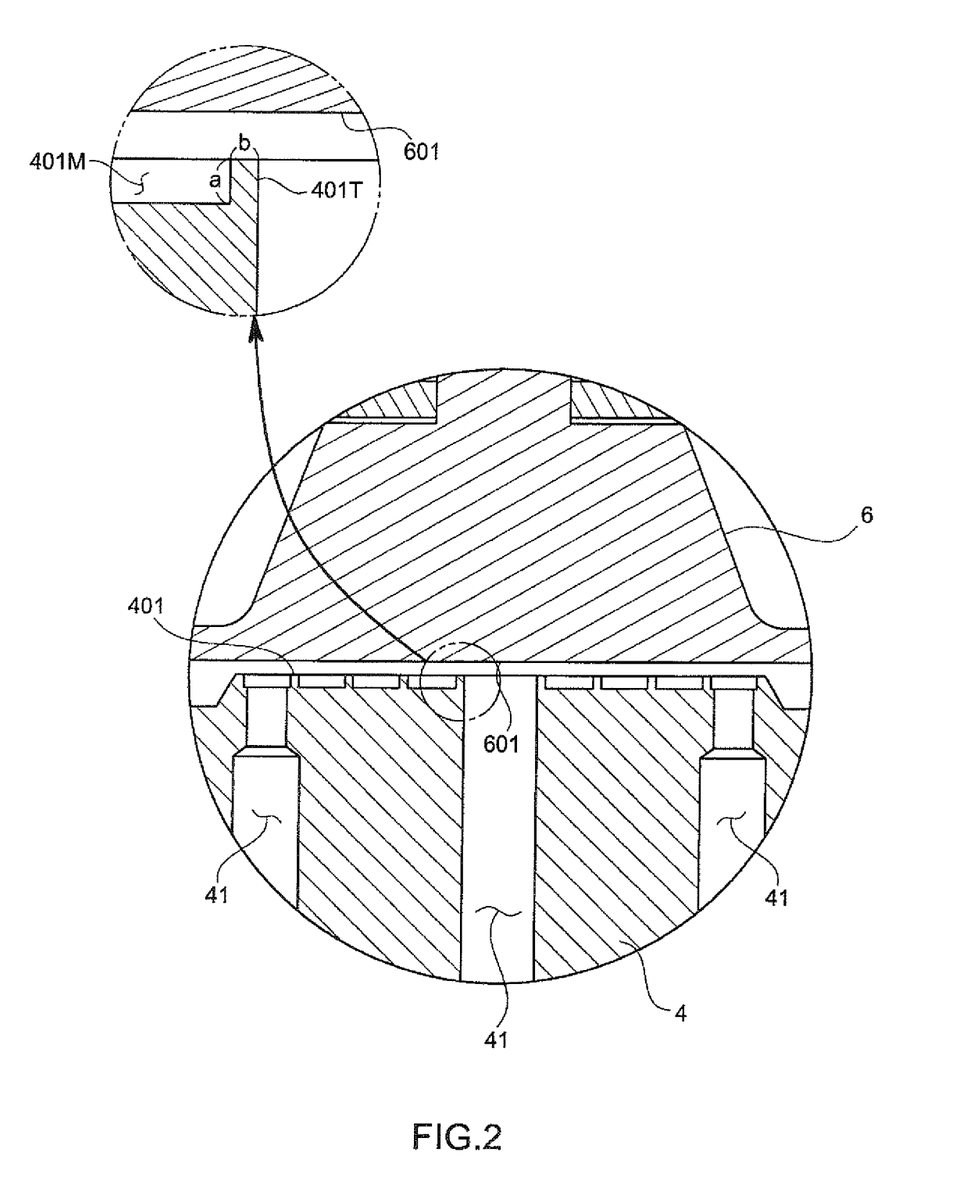
FIG. 2 is a partially enlarged cross-sectional view of this embodiment.

More specifically, as shown in FIG. 3 or the like, the concave groove 401M where the inflow orifice 401A is formed and the concave groove 401M where the outflow orifice 401B is formed are alternately formed. Then it is possible to prevent the fluid from flowing into the outflow orifice 401B from the inflow orifice 401A in a state in which the seating surface 601 is seated on the valve seated surface 401. In addition, since the upper surface of the convexity 401T formed on the valve seated surface 401 makes contact with the seating surface 601, it is possible to diminish a contact area of the valve seated surface 401 and the seating surface 601, thereby improving an effect of shutting away the fluid although a pushing force of the actuator 7 is small. In addition, since the contact area is small, it is possible to reduce the pressure loss. Furthermore, in the partially enlarged view shown in FIG. 2, a relationship between a height a of the convexity 401T and a width b of the convexity 401T is 2b<a. As a result, it is possible to further reduce the pressure loss, thereby enabling to flow the fluid at a high flow rate.

Furthermore, the multiple inflow orifices 401A and the multiple outflow orifices 401B are, as shown in FIG. 3 or the like, formed radially with a center on the inflow orifice 401A (a center of the valve seated surface 401) formed at a center of the valve seat member 4, and generally in a line in a radial direction.

As mentioned above, since the inflow orifice 401A and the outflow orifice 401B are arranged alternately on every other concentrically formed concave groove 401M, the flow can be considered to be substantially the same as the flow outflows from an opening having the same diameter as an external diameter of the concave groove 401 and it is possible to shorten a distance between the inflow orifice 401A and the outflow orifice 401B as well. Then it is possible to reduce the pressure loss and to flow the fluid at a high flow rate.

A configuration of the inside inflow channel 41 comprises, as show in FIG. 5 and FIG. 6, one large diameter channel 41m formed from the bottom surface of the valve seat member 4 to a predetermined height along an axial direction and multiple small diameter channels 41n that are in communication with the large diameter channel 41m and formed along the axial direction. Each of the small diameter channels 41n is in communication with the inflow orifice 401A formed on the bottom surface of the concave groove 401M. With this arrangement, the fluid from the inflow channel 51 is divaricated by the inside inflow channel 41 and supplied to the multiple inflow orifices 401A.

A configuration of the inside outflow channel 42 comprises, as shown in FIG. 5 and FIG. 6, multiple partial channels (vertical channels) 42m formed from the upper surface of the valve seat member 4 to a predetermined depth along the axial direction and a partial channel (horizontal channel) 42n that is in communication with the vertical channels 42m and formed perpendicular to the axial direction. Each of the vertical channels 42m is in communication with the outflow orifice 401B formed on the bottom surface of the concave groove 401M. In addition, the horizontal channel 42n is in communication with the multiple (two or three in this embodiment) vertical channels 42m and opens on a side peripheral surface of the valve seat member 4. With this arrangement, the fluid flowing from the multiple outflow orifices 401B converges into the inside outflow channel 42. In addition, the fluid flowing out from the inside outflow channel 42 converges into a channel formed by the side peripheral surface of the valve seat member 4 and the inside peripheral surface of the concave part for housing 53 and then is introduced into the outflow channel 52.

<Operation of the Flow Control Valve 3>

Next, an operation of the flow control valve 3 having this arrangement will be explained.

The flow control valve 3 in this embodiment is of a normal open type and the valve seated surface 401 and the seating surface 601 are in a separated state (seat is separated) at a time when a driving voltage is not applied to the actuator 7. In this state, the fluid flowing in the inflow channel 51 is expelled into the outflow channel 52 through the multiple inflow orifices 401A and the multiple outflow orifices 401B.

At a time when a driving voltage is applied to the actuator 7, the actuator 7 moves the seating surface 601 of the diaphragm 6 toward a side of the valve seated surface 401 so that the valve seated surface 401 and the seating surface 601 are pushed to make contact with each other. At this time, the flow of the fluid ceases in a state in which the fluid is filled in a space formed by the concave groove 401M of the valve seat member 4 and the seating surface 601.

In order to flow the fluid, next the driving voltage is ceased to be applied to the actuator 7. Then the seating surface 601 of the diaphragm 6 is separated from the valve seating surface 401 and the fluid is expelled from all of the concave grooves 401M where the inflow orifices 401A are formed, and then flows into the concave grooves 401M where the outflow orifices 401B are formed. At this time, in the multiple concentrically formed concave grooves 401M, the fluid flows from the inflow orifices 401A arranged in the concave groove 401M to the outflow orifices 401B arranged in the concave groove 401M next to the former concave groove 401M.

<Effect of this Embodiment>

In accordance with the mass flow controller 100 of the embodiment having the above-mentioned arrangement, since it is possible to reduce the pressure loss between the inflow orifices 401A and the outflow orifices 401B and to flow the fluid at a high flow rate under a low differential pressure in spite of a compact arrangement of the flow control valve 3, it is possible for the compact mass flow controller 100 to control the fluid at a high flow rate.

<Other Modified Embodiment>

The present claimed invention is not limited to the above-mentioned embodiment. In the following explanation, the same parts as those in the above-mentioned embodiment are denoted by the same reference numerals as those in the embodiment.

For example, this invention can be also applied to a flow control valve of a normal close type.

Figure 7:
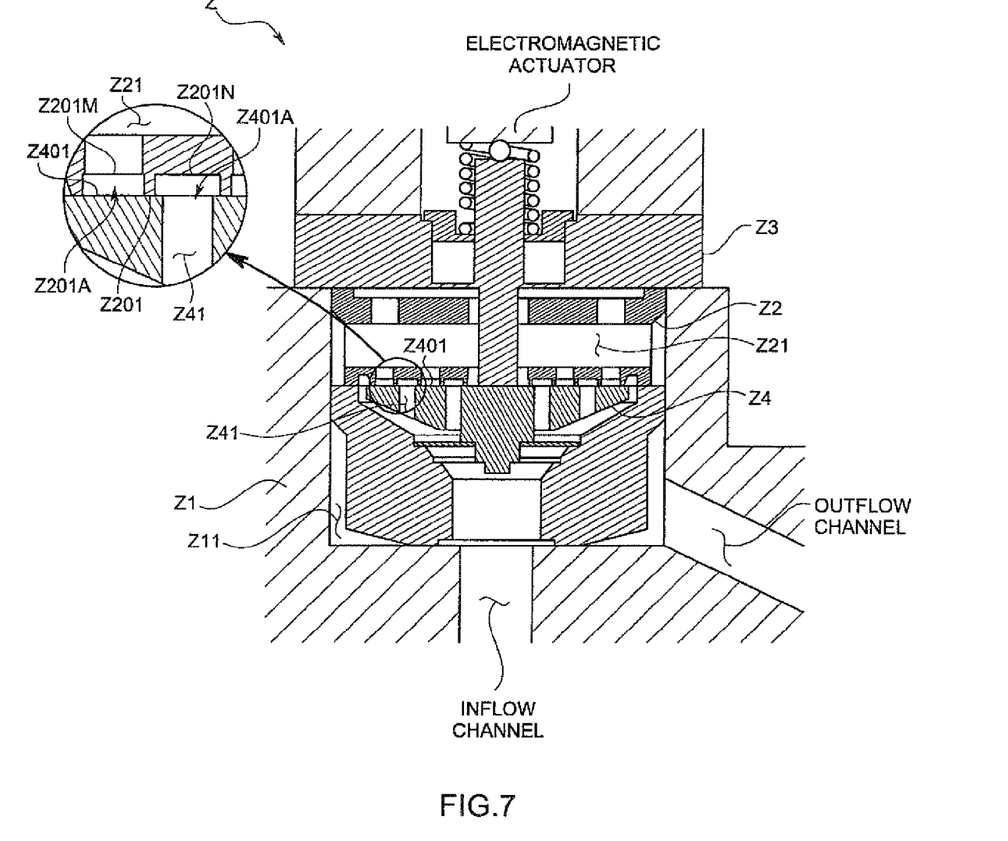
FIG. 7 is an overall pattern diagram of a mass flow controller in accordance with a modified embodiment.

A flow control valve Z comprises, as shown in FIG. 7, a valve seat member Z2 fixed to the inside of a concave part for housing Z11 of a body block Z1, and a valve body member Z4 that is connected to a diaphragm Z3 and that makes a back and forth movement relative to the valve seat member Z2 in the concave part for housing Z11 of the body block Z1.

Multiple inside inflow channels Z41 are formed in the valve body member Z4, and multiple inflow orifices Z401A are formed on a seated surface Z401 located at a side of the valve seat member Z2. In addition, an inside outflow channel Z21 is formed in the valve seat member Z2 and multiple outflow orifices Z201A are formed on the valve seating surface Z201 located at a side of the valve body member Z4. Thus, in this modified embodiment, the inflow orifices and the outflow orifices are formed on the valve seated surface, and the first member where the inside inflow channel is formed is the valve seat member, and the second member where the inside outflow channel is formed is also the valve seat member.

Furthermore, multiple concave grooves Z201M are concentrically formed on the valve seating surface Z201, and an outflow orifice Z201A is formed on a bottom surface of the concave groove Z201M. It is so formed that the inflow orifice Z401A does not open on the concave groove Z201M for expelling, i.e., outflowing, the fluid where the outflow orifice Z201A is formed in a state in which the valve seating surface Z201 is seated on the seated surface Z401. At this time, a concave groove Z201N for taking in, i.e. inflowing, the fluid is formed to correspond with the inflow orifice Z401A formed on the valve body member Z4. The concave groove Z201N for inflowing the fluid may be formed on the seating surface Z201 of the valve body member Z4.

In addition, in the above-mentioned embodiment, the outflow orifice 401B and the inflow orifice 401A are formed alternately on the concentrically formed concave grooves 401M, however, it is not limited to this and may be any as long as the outflow orifice 401B and the inflow orifice 401A are not formed in the same concave groove 401M.

Furthermore, the pressure loss is made to be small as much as possible by forming the concave groove 401M in the above-mentioned embodiment, however, if considering a flow only, the concave groove 401M may not be formed as long as multiple inflow orifices 401A and multiple outflow orifices 401B are formed.

In the above-mentioned embodiment, multiple inflow orifices and multiple outflow orifices are formed on the valve seated surface of the valve seat member, however, multiple inflow orifices and multiple outflow orifices may be formed on the seating surface or, multiple inflow orifices and multiple outflow orifices may be formed on both the valve seated surface and the seating surface.

Figure 8:
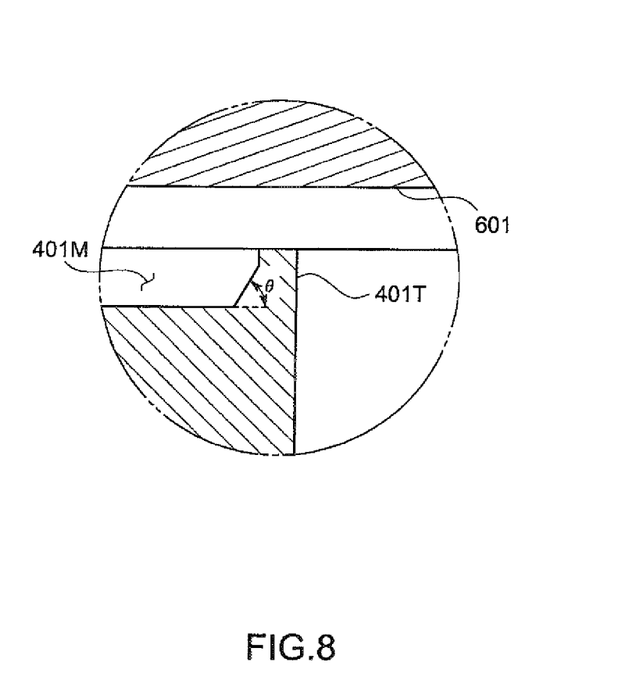
FIG. 8 is a partially enlarged cross-sectional view of a convexity in accordance with the embodiment of FIG. 1.

In addition, a piezoelectric valve is used as the flow control valve in the above-mentioned embodiment, however, a solenoid-operated valve may be used. In case that the solenoid-operated valve is used, since an aperture becomes large compared with a case of using the piezoelectric valve, it is possible to flow the fluid at a high flow rate by the use of a more compact flow control valve. The relationship between the height a of the convexity 401T and the width b of the convexity 401T is set to be 2b<a so as to reduce the pressure loss in the above-mentioned embodiment, however, a proximal end portion of the convexity 401T may be tapered to be wider toward the proximal end as shown in FIG. 8. In this case, it is preferable that an angle θ between the tapered shape of the convexity 401T and a bottom surface of concave groove 401M is about 60 degrees. With this arrangement, it is also possible to further reduce the pressure loss and to flow the fluid at a high flow rate.

In addition, a part or all of the above-mentioned embodiment or the modified embodiment may be appropriately combined. The present claimed invention is not limited to the above-mentioned embodiment and it is a matter of course that this invention may be variously modified without departing from the spirit of the invention.

The invention claimed is:

1. A flow control valve that is arranged in a flow channel where fluid flows and that expels the fluid into an outflow channel as being a downstream flow channel by controlling a flow of the fluid from an inflow channel as being an upstream flow channel, comprising:

a valve seat member having a valve seated surface; and a valve body member having a seating surface that is seated on the valve seated surface;

wherein multiple inflow orifices are provided on the valve seated surface and multiple outflow orifices are formed on a surface selected from the group consisting of the valve seated surface and the seating surface, and the inflow orifices and the outflow orifices are formed so as not to overlap each other in a state in which the seating surface is seated on the valve seated surface;

wherein an inside inflow channel is formed inside a first member where the inflow orifices are formed and an inside outflow channel comprising a downstream-side inside outflow channel is formed inside a second member where the outflow orifices are formed; and wherein the inside inflow channel is in communication with the inflow channel and a plurality of the inflow orifices, and the downstream-side inside outflow channel is in communication with the outflow channel and a plurality of the outflow orifices via a plurality of upstream-side inside outflow channels;

wherein the inflow orifices are formed on multiple annular concave grooves that are formed on a surface selected from the group consisting of the valve seated surface and the seating surface;

wherein the outflow orifices are formed on multiple annular concave grooves that are formed on a surface selected from the group consisting of the valve seated surface and the seating surface and that are different from the concave grooves where the inflow orifices are formed; and wherein a combined opening area of the inflow orifices formed on an outermost side concave groove of the multiple annular concave grooves containing the inflow orifices is larger than a combined opening area of the inflow orifices formed on another of the multiple annular concave grooves containing the inflow orifices.

2. The flow control valve described in claim 1, wherein the inflow orifices and the outflow orifices are formed on the valve seated surface, and the first member where the inside inflow channel is formed is the valve seat member, and the second member where the inside outflow channel is formed is also the valve seat member; and wherein the inflow orifices and the outflow orifices are formed on bottom surfaces of the multiple annular concave grooves that are formed on the valve seated surface, and the inflow orifices are formed on a first part of the bottom surfaces of the concave grooves that is different from a second part of the bottom surfaces of the concave grooves where the outflow orifices are formed.

3. The flow control valve described in claim 2,
wherein the multiple concave grooves where the inflow orifices are formed and the multiple concave grooves where the outflow orifices are formed are generally concentrically formed concave grooves; and
wherein the multiple concave grooves where the inflow orifices are formed and the multiple concave grooves where the outflow orifices are formed are alternately formed.

4. The flow control valve described in claim 1,
wherein the inflow orifices and the outflow orifices are arranged radially.

5. A flow control valve that is arranged in a flow channel where fluid flows and that expels the fluid into an outflow channel as being a downstream flow channel by controlling a flow of the fluid from an inflow channel as being an upstream flow channel, comprising:
a valve seat member having a valve seated surface; and
a valve body member having a seating surface that is seated on the valve seated surface, wherein
multiple inflow orifices are provided on a surface selected from the group consisting of the valve seated surface and the seating surface, and multiple outflow orifices are formed on a surface selected from the group consisting of the valve seated surface and the seating surface; and
wherein the inflow orifices and the outflow orifices are formed so as not to overlap each other in a state that the seating surface is seated on the valve seated surface;
wherein an inside inflow channel is formed inside a member where the inflow orifices are formed, and an inside outflow channel comprising a downstream-side inside outflow channel is formed inside a member where the outflow orifices are formed; and
wherein the inside inflow channel is in communication with the inflow channel and a plurality of the inflow orifices and the downstream-side inside outflow channel is in communication with the outflow channel and a plurality of the outflow orifices via a plurality of upstream-side inside outflow channels;
wherein the inflow orifices and the outflow orifices are arranged on bottom surfaces of concave grooves formed on the valve seated surface or the seating surface; and
wherein a combined opening area of the inflow orifices formed on an outermost side concave groove of the concave grooves containing the inflow orifices is larger than a combined opening area of the inflow orifices formed on another of the concave grooves containing the inflow orifices.

6. A mass flow controller, comprising:
a flow sensor;
a flow control valve; and
a control part that controls a valve open degree of the flow control valve based on a measured flow value output by the flow sensor and a set flow value as being a target flow;
wherein the flow control valve is arranged in a flow channel where fluid flows and that expels the fluid into an outflow channel as being a downstream flow channel by controlling a flow of the fluid from an inflow channel as being an upstream flow channel, the flow control valve including:
a valve seat member having a valve seated surface; and
a valve body member having a seating surface that is seated on the valve seated surface;
wherein multiple inflow orifices are provided on the valve seated surface and multiple outflow orifices are formed on a surface selected from the group consisting of the valve seated surface and the seating surface, and the inflow orifices and the outflow orifices are formed so as not to overlap each other in a state in which the seating surface is seated on the valve seated surface;
wherein an inside inflow channel is formed inside a first member where the inflow orifices are formed, and an inside outflow channel comprising a downstream-side inside outflow channel is formed inside a second member where the outflow orifices are formed; and
wherein the inside inflow channel is in communication with the inflow channel and a plurality of the inflow orifices, and the downstream-side inside outflow channel is in communication with the outflow channel and a plurality of the outflow orifices via a plurality of upstream-side inside outflow channels;
wherein the inflow orifices and the outflow orifices are formed on multiple annular concave grooves that are formed on a surface of the valve seated surface or the seating surface; and
wherein a combined opening area of the inflow orifices formed on an outermost side concave groove of the multiple annular concave grooves containing the inflow orifices is larger than a combined opening area of the inflow orifices formed on another of the multiple annular concave grooves containing the inflow orifices.

7. The mass flow controller described in claim 6, further comprising:
wherein the inflow orifices and the outflow orifices are formed on the valve seated surface, and the first member where the inside inflow channel is formed is the valve seat member, and the second member where the inside outflow channel is formed is also the valve seat member; and
wherein the inflow orifices and the outflow orifices are formed on bottom surfaces of the multiple annular concave grooves that are formed on the valve seated surface, and the inflow orifices are formed on a first part of the bottom surfaces of the concave grooves that is different from a second part of the bottom surfaces of the concave grooves where the outflow orifices are formed.

8. The mass flow controller described in claim 7,
wherein the multiple concave grooves where the inflow orifices are formed and the multiple concave grooves where the outflow orifices are formed are generally concentrically formed concave grooves; and
wherein the multiple concave grooves where the inflow orifices are formed and the multiple concave grooves where the outflow orifices are formed are alternately formed.

9. The mass flow controller described in claim 6,
wherein the inflow orifices and the outflow orifices are arranged radially.

10. The flow control valve described in claim 5,
wherein the inflow orifices and the outflow orifices are formed on the valve seated surface and the member where the inside inflow channel is formed and the member where the inside outflow channel is formed is the same valve seat member; and wherein the inflow orifices and the outflow orifices are formed on bottom surfaces of the concave grooves that are formed on the valve seated surface, and the inflow orifices are formed on a first part of the bottom surfaces of the concave grooves that is different from a second part of the bottom surfaces of the concave grooves where the outflow orifices are formed.

11. The flow control valve described in claim 1,
wherein the first member where the inside inflow channel is formed is the valve body member and the second member where the inside outflow channel is formed is the valve seat member.

12. The flow control valve described in claim 5,
wherein the first member where the inside inflow channel is formed is the valve body member and the second member where the inside outflow channel is formed is the valve seat member.

13. The mass flow controller described in claim 6,
wherein the first member where the inside inflow channel is formed is the valve body member and the second member where the inside outflow channel is formed is the valve seat member.

* * * * *